(12) United States Patent
Nishi et al.

(10) Patent No.: US 8,567,854 B2
(45) Date of Patent: Oct. 29, 2013

(54) FRONT STRUCTURE OF VEHICLE

(75) Inventors: Hiroyuki Nishi, Hiroshima (JP);
Yasuyuki Emi, Hiroshima (JP); Tetsuo Nagata, Hiroshima (JP); Toshiaki Wakabayashi, Hiroshima (JP); Kazuma Kondo, Hiroshima (JP); Toshio Sakamoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 46 days.

(21) Appl. No.: 13/212,853

(22) Filed: Aug. 18, 2011

(65) Prior Publication Data
US 2012/0049547 A1    Mar. 1, 2012

(30) Foreign Application Priority Data

Sep. 1, 2010  (JP) ................................. 2010-195704
May 13, 2011  (JP) ................................. 2011-108287

(51) Int. Cl.
*B62D 25/08*    (2006.01)

(52) U.S. Cl.
USPC .................. 296/193.09; 293/132; 296/187.04

(58) Field of Classification Search
USPC ............. 293/133, 132, 136, 137; 296/187.04, 296/193.09, 193.1, 203.02
See application file for complete search history.

(56) References Cited

U.S. PATENT DOCUMENTS

| 6,880,882 B2 * | 4/2005 | Andre et al. ............. 296/193.09 |
| 2006/0119139 A1 * | 6/2006 | Luo et al. ................. 296/203.02 |
| 2010/0127533 A1 * | 5/2010 | Gonin ....................... 296/193.09 |

FOREIGN PATENT DOCUMENTS

| DE | 102 58 629 A1 | 7/2004 |
| EP | 1 419 936 B1 | 4/2009 |
| JP | 2004-207061 A | 7/2004 |
| JP | 2010-006238 A | 1/2010 |
| WO | WO 2009024708 A2 * | 2/2009 |

OTHER PUBLICATIONS

The English translation of the Office Action issued by the German Patent and Trade Mark Office on Feb. 28, 2013, which corresponds to DE Application No. 10 2011 110 009.5 and is related to U.S. Appl. No. 13/212,853.

* cited by examiner

*Primary Examiner* — Dennis Pedder
*Assistant Examiner* — Beverly Becker
(74) *Attorney, Agent, or Firm* — Studebaker & Brackett PC

(57) ABSTRACT

An impact absorption member is provided behind a bumper face, a lower stiffener is provided below this member and projects forward to sweep a leg portion of an object hitting against a front potion of a vehicle, and headlamp units are provided at both side portions of the bumper face. A lamp housing of the headlamp unit is supported at a vehicle-body member located in back of the lamp housing, a load absorption portion provided on the inside of and rearward from an edge of the bumper face to absorb an impact load is provided integrally at the lamp housing, and a load transmission portion to transmit the impact load inputted to the bumper face to the load absorption portion is provided at the bumper face.

15 Claims, 11 Drawing Sheets

FRONT STRUCTURE OF VEHICLE

BACKGROUND OF THE INVENTION

The present invention relates to a front structure of a vehicle in which a bumper face is provided at a front portion of the vehicle and headlamp units are provided at both side portions of the bumper face.

Conventionally, as disclosed in Japanese Patent Laid-Open Publication No. 2010-6238, in the impact absorption structure of the vehicle-body front portion in which the radiator grill is attached to the front bulkhead and the bumper beam is provided below the radiator grill, the stay is provided to extend between the bulkhead beam constituting the upper portion of the front bulkhead and the bumper beam, the impact absorption member is attached to the stay, the shaft member is attached to the back face of the radiator grill, and the shaft member and the impact absorption member are coupled via a ball-face journal. Thus, the structure which can efficiently absorb the impact which an object may receive from the load directed to the swing shaft of the radiator grill or the load acting in a specified direction which slants relative to the vehicle longitudinal direction is known.

Further, Japanese Patent Laid-Open Publication No. 2004-207061 discloses the headlamp attachment structure in which the engagement groove portion to support the outer lens by engaging with the upper-side tip of the outer lens and the vehicle-body attachment portion provided to extend downward from the engagement groove portion and fixed to the radiator core support upper are provided at the headlamp housing, and the impact absorption portion having a rearward open section is formed over a specified range from the engagement groove portion of the headlamp housing to the vehicle-body attachment portion, which can properly absorb the impact which an object may receive from the force which is inputted obliquely from the front side to the outer lens of the headlamp unit.

According to the impact absorption structure of the vehicle-body front portion disclosed in the above-described first patent document, since the input load which acts when an object hits against the side portion of the vehicle body is absorbed by the single impact absorption member provided behind the bumper face at the central position in the vehicle width direction, it may be difficult to absorb the input load sufficiently. Thus, there remains room for improvement. In particular, in case the front face side portion of the vehicle body is formed in a streamlined shape by forming both side portions of the bumper face with a specified curvature from a proper vehicle-body design aspect, the absorption function of the input load through a swing move of the radiator grill around the above-described ball-face journal according to the input load caused by the hitting of the side portions of the bumper face with the object may not be achieved sufficiently. Thus, the impact which the object may receive may not be effectively absorbed.

Further, in case both side portions of the vehicle body are curved with the specified curvature as described above, the lower stiffener to make the object hitting against the front face of the vehicle body jump onto an engine hood may not be designed to project forward greatly at its both side portions. Also, since it is difficult that the thickness of the impact absorption member to prevent the large impact load from being inputted to the above-described object may not be ensured sufficiently at both side portions of the front portion of the vehicle body. Thus, it has been demanded that the impact which the object may receive can be absorbed particularly effectively.

Meanwhile, since the impact absorption portion is formed by the engagement groove portion and the like provided at the headlamp housing according to the invention disclosed in the above-described second patent document, the object can be protected when hitting against the arrangement portion of the headlamp housing. However, there is a problem in that in case the object hits against the side portion of the bumper face located on the inside of the headlamp housing or the like, the object may not be effectively protected by the above-described impact absorption portion.

SUMMARY OF THE INVENTION

The present invention has been devised in view of the above-described problem, and an object of the present invention is to provide a front structure of a vehicle which can effectively absorb the impact which an object may receive even when the object hits against the side portion of the front portion of the vehicle or the like.

According to the present invention, there is provided a front structure of a vehicle, comprising a bumper face provided at a front portion of the vehicle, an impact absorption member provided behind the bumper face to absorb an impact load inputted to a specified-height position of the bumper face through deformation thereof, a lower stiffener provided below the impact absorption member and projecting forward to sweep a leg portion of an object hitting against the front portion of the vehicle, and headlamp units provided at both side portions of the bumper face, wherein a lamp housing of the headlamp unit is supported at a vehicle-body member located in back of the lamp housing, a load absorption portion provided on the inside of and rearward from an edge of the bumper face to absorb an impact load is provided integrally at the lamp housing, and a load transmission portion to transmit the impact load inputted to the bumper face to the load absorption portion is provided at the bumper face.

According to the present invention, when any object hits against the central portion of the central face of the vehicle or the like, the impact load can be properly absorbed by the impact absorption member provided behind the bumper face, and also the leg portion of the object is swept onto the engine hood so that the object can be properly received by this engine hood and thereby protected. Further, when the object hits against the side portion of the vehicle's front face, the impact load can be efficiently transmitted from the load transmission portion provided at the bumper face to the load absorption portion provided integrally with the lamp housing and a vehicle-body side member located rearward as well as the impact load can be properly absorbed by the impact absorption member provided behind the bumper face. Thus, the impact which the object hitting against the front face of the vehicle body may receive can be effectively absorbed.

According to an embodiment of the present invention, a bumper beam is provided behind the bumper face to extend in a vehicle width direction, the impact absorption member is attached to a front face of the bumper beam, and the load absorption portion is provided above the bumper beam. Thereby, the impact load inputted through the object's hitting against the side portion of the vehicle's front face can be efficiently transmitted to the impact absorption member and the load absorption portion provided above the impact absorption member and thereby effectively absorbed, so that the impact which the object may receive can be effectively absorbed. Further, since the impact absorption member is attached to the front face of the bumper beam which, in general, may have a relatively high rigidity, a direct contact of the object with the bumper beam is avoided so that the object can be effectively restrained from receiving an improperly large amount of impact, and also the absorption effect of the impact load by the impact absorption member can be sufficiently achieved.

According to another embodiment of the present invention, the load absorption portion is provided at a specified position which is located above and away from an outside end portion of the impact absorption member attached to the bumper beam. Thereby, even in case the object hits against the vicinity of the outside end portion of the impact absorption member and therefore the impact absorption effect of the impact absorption member may not be achieved sufficiently, the impact load can be efficiently absorbed by using the load absorption portion provided at the lamp housing, so that the impact which the object may receive can be effectively absorbed.

According to another embodiment of the present invention, the outside end portion of the impact absorption member is provided to extend outward and rearward along a back face of the bumper face, and the thickness of the outside end portion of the impact absorption member is configured to be smaller than that of an inside portion of the impact absorption member. Thereby, the vehicle body is formed in the streamlined shape, so that the vehicle's design can be improved. And, even in case the impact load inputted through the object's hitting against the side portion of the front face of the vehicle or the like may not be sufficiently absorbed by the outside end portion of the outside end portion of the impact absorption member, the impact load can be transmitted to the load absorption portion located above the impact absorption member and thereby absorbed properly, so that the impact which the object may receive can be effectively absorbed.

According to another embodiment of the present invention, plural main attachment portions which are attached to a vehicle-body member located behind the bumper beam are provided at the headlamp unit, and a sub attachment portion which is attached to another vehicle-body member is provided at a periphery of the load absorption portion. Thereby, since the plural main attachment portions which are attached to the vehicle-body member located behind the bumper beam, such as a radiator shroud support member, are provided at the headlamp unit, and the sub attachment portion which is attached to another vehicle-body member, such as a radiator shroud, is provided at the periphery of the load absorption portion, the impact load transmitted to the load absorption portion of the lamp housing via the load transmission portion of the bumper face in the vehicle frontal collision or the like can be dispersed through a transmission route where it is transmitted from the main attachment portion to the radiator shroud support member or the like by way of the lamp housing and another transmission route where it is transmitted from the sub attachment portion to the radiator shroud or the like by way of the load absorption portion. Thereby, the impact which the object may receive can be effectively absorbed.

According to another embodiment of the present invention, a radiator shroud or a front bulkhead is provided between vehicle-body frames provided at both sides of the vehicle, and the sub attachment portion of the headlamp unit is attached to the radiator shroud or the front bulkhead. That is, the sub attachment portion of the load absorption portion is attached to the radiator shroud which is arranged between right and left vehicle-body frames and attached to these frames or the front bulkhead (see the above-described first patent document) which is integrally formed with the vehicle-body frames, so that both side portions of the headlamp unit are supported by the vehicle-body side member located behind the bumper beam. Thereby, the impact load transmitted to the load absorption portion of the lamp housing via the load transmission portion of the bumper face in the vehicle frontal collision or the like can be transmitted to either the radiator shroud and the front bulkhead or the vehicle-body side member, such as the radiator shroud support member, and thereby absorbed properly, so that the impact which the object may receive can be more effectively absorbed.

According to another embodiment of the present invention, the load absorption portion has plural ribs formed at a back face thereof and is formed in a boxy shape to face the load transmission portion. Thereby, the load absorption function of the load absorption portion can be ensured sufficiently with a simple and light-weight structure, and the impact load can be efficiently absorbed by the load absorption portion without increasing the weight of the vehicle body, so that the impact which the object hitting against the front face portion of the vehicle body may receive can be effectively absorbed.

According to another embodiment of the present invention, the bumper face has a bumper-face main portion and a design face portion attached to an opening portion formed at the bumper-face main portion, and the load transmission portion is formed integrally at the design face portion of the bumper face. Thereby, the impact load inputted to the bumper face can be efficiently transmitted to the load absorption portion and thereby absorbed effectively by using the design face portion constituting the bumper face.

According to another embodiment of the present invention, the load transmission portion is provided in back of the bumper-face main portion. Thereby, the impact load inputted through the object's hitting against the bumper-face main portion can be efficiently transmitted to the load absorption portion from the load transmission portion and thereby absorbed effectively, so that the impact which the object may receive can be absorbed sufficiently.

According to another embodiment of the present invention, a recess for positioning or a projection for positioning is formed at a periphery of the load absorption portion, and a projection for positioning which corresponds to the recess for positioning or a recess for positioning which corresponds to the projection for positioning is formed at a periphery of the load transmission portion. Thereby, the projection for positioning is inserted into the recess for positioning, so that the bumper face at which the load transmission portion is formed can be prevented from moving and thereby its attachment state can be stable. Accordingly, even if the bumper face having a large area is made of a thin plate member having a low rigidity, some secular change occurs to the bumper face, or the like, the attachment state of the bumper face can be prevented from being unstable, so that the stable attachment state of the bumper face can be maintained properly in the long term.

According to another embodiment of the present invention, the lower stiffener is configured such that a forward-projection amount of a central portion thereof relative to the bumper beam is greater than that of a side portion thereof relative to the bumper beam. Thereby, the object hitting against the central portion of the vehicle's front face can be effectively swept onto the engine hood by the lower stiffener and properly received by the engine hood. Meanwhile, when the object hits against the side portion of the vehicle's front face, the impact load acting on the object can be absorbed effectively by the impact absorption member and the load absorption portion which are provided at both side portions of the bumper face.

According to another embodiment of the present invention, the lower stiffener is supported at a lower portion of the radiator shroud or front bulkhead, respective side end portions of the lower stiffener and the impact absorption member and the load absorption portion are provided on the outside of the lower portion of the radiator shroud or front bulkhead. Thereby, even in case it becomes difficult that the object hitting against the side portion of the vehicle's front face is effectively swept onto the engine hood by the lower stiffener, the impact load acting on the object can be absorbed effectively by the impact absorption member and the load absorption portion which are provided at the side portion of the vehicle's front face.

According to another embodiment of the present invention, a notch to prevent interference with a device provided at the font portion of the vehicle is formed at a side end portion of the lower stiffener. Thereby, while the object-sweeping function of lower stiffener may not be performed sufficiently in the case of the object's hitting against the side portion of the vehicle's front face, the object can be protected effectively by the impact absorption member and the load absorption portion which are provided at the side portion of the vehicle's front face.

Other features, aspects, and advantages of the present invention will become apparent from the following description which refers to the accompanying drawings.

BRIEF DESCRIPTION OF THE DRAWINGS

FIG. 7 is a side view showing a specific structure of a seatbelt device.

DETAILED DESCRIPTION OF THE INVENTION

Hereinafter, preferred embodiments of the present invention will be described referring to the accompanying drawings.

Figure 1:
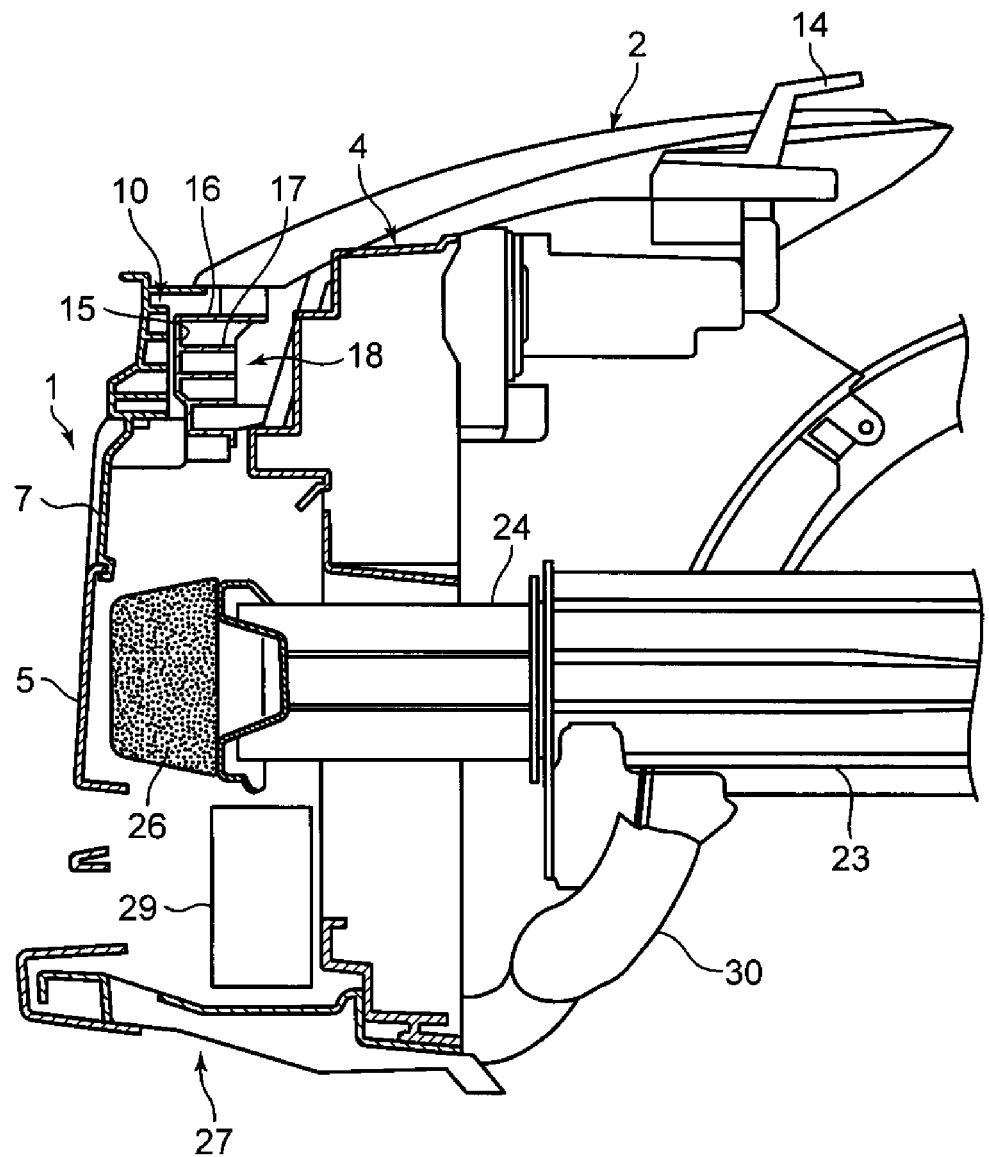
FIG. 1 is a side-sectional view showing an embodiment of a front structure of a vehicle according to the present invention.
Figure 2:
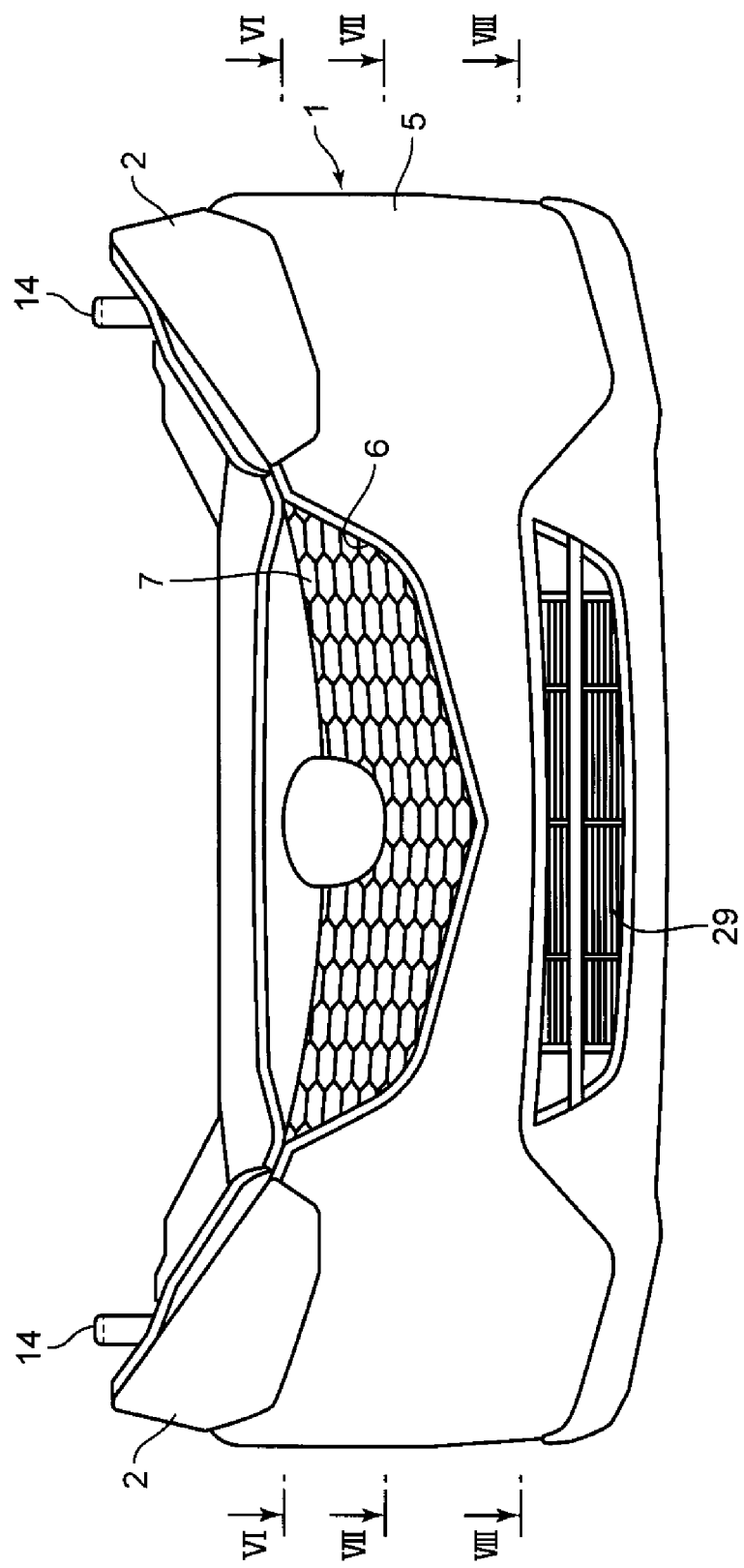
FIG. 2 is an elevational view showing a specific structure of a front face of the vehicle.
Figure 3:
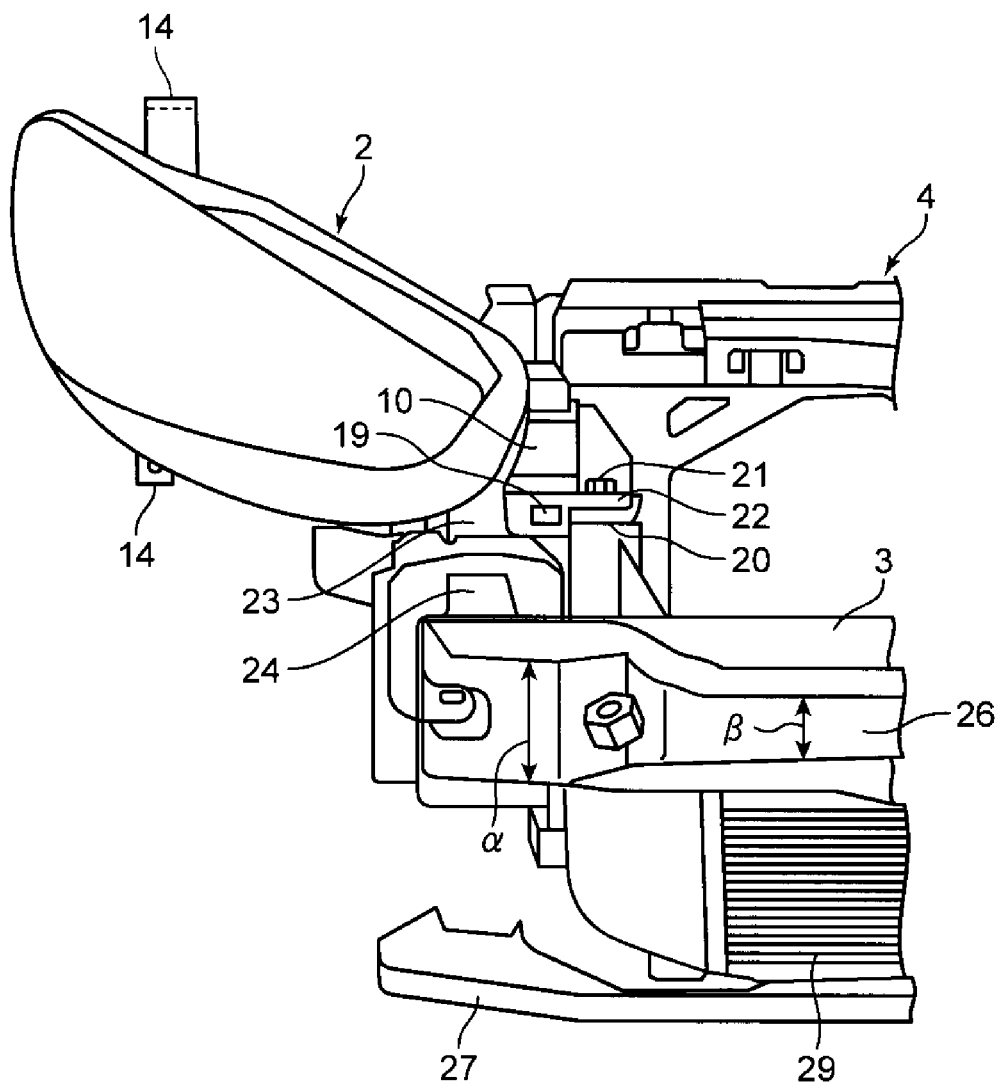
FIG. 3 is an elevational view showing an attachment state of a headlamp unit.

FIGS. 1 through 3 show an embodiment of a front structure of a vehicle according to the present invention. This front structure of the vehicle comprises a bumper face 1 which constitutes a front face of the vehicle, headlamp units 2 which are arranged both sides of an upper portion of the bumper face 1, a bumper beam 3 which is arranged behind the bumper face 1 and extends in a vehicle width direction along a central portion, in a vertical direction, of the bumper face 1, and a radiator shroud 4 which is provided behind the bumper beam 3 and covers a front portion of the engine room.

Figure 4:
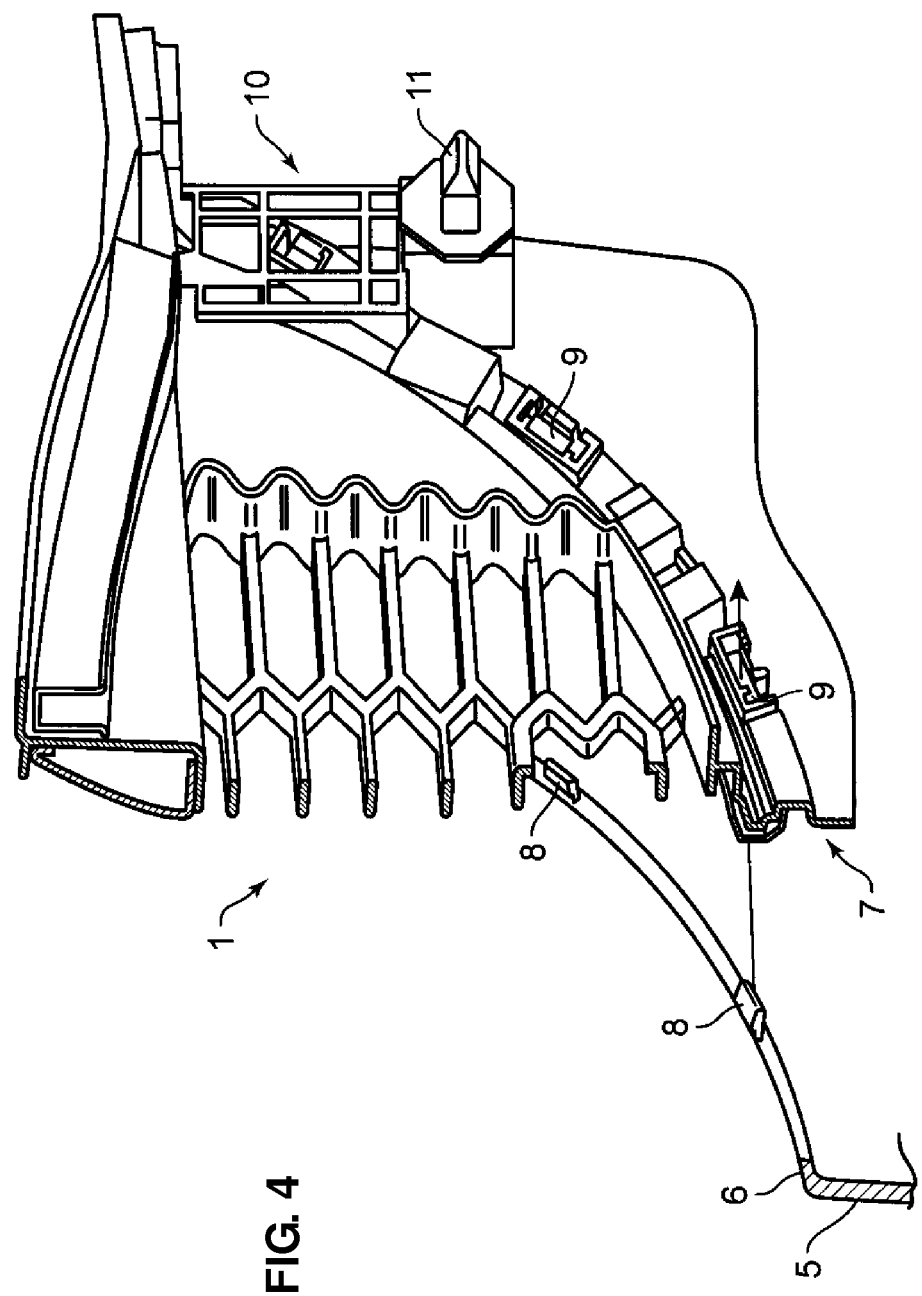
FIG. 4 is an elevational view showing a specific structure of a bumper face.

The bumper face 1, as shown in FIG. 4, comprises a bumper-face body portion 5 which has arrangement portions of the headlamp units 2 at its upper right and left portions and a design face portion 7 which covers from behind an opening portion 6 formed at an upper central position of the bumper-face main portion 5 between the headlamp units 2. The design face portion 7 is a plastic-made radiator grill having many air inlet ports, which has some engagement holes 9 formed at its outer peripheral portion. Herein, engaging portions 8 which are formed to project at a peripheral edge portion of the above-described opening portion 6 are inserted into the corresponding engagement holes 9 for engagement, so that the design face portion 7 is attached to the bumper-face main portion 5.

A load transmission portion 10, which is comprised of grid-shaped projections, is integrally formed at the back face of the design face portion 7. This load transmission portion 10 is provided in back of the bumper face 1 and transmits the impact load inputted to the bumper face 1 to a load absorption portion 18 which will be described later. This load transmission portion 10 is located at a specified position which is located near an outside end portion of an impact absorption member 26, which will be described later, attached to the front face of the bumper beam 3 and which is located upward away from the impact absorption member 26 with a specified distance so as to face a front face of the load absorption portion 18 which is provided at the headlamp unit 2 (see FIG. 3).

A projection for positioning 11 which projects rearward is integrally formed below the load transmission portion 10 provided at the back face of the design face portion 7. This projection for positioning 11 is inserted into a recess for positioning 19, which will be described later, provided below the load absorption portion 18 when the bumper face 1 is assembled to the vehicle body, so that the bumper face 1 can be prevented from improperly moving vertically or laterally to make its attachment state stable.

Figure 5:
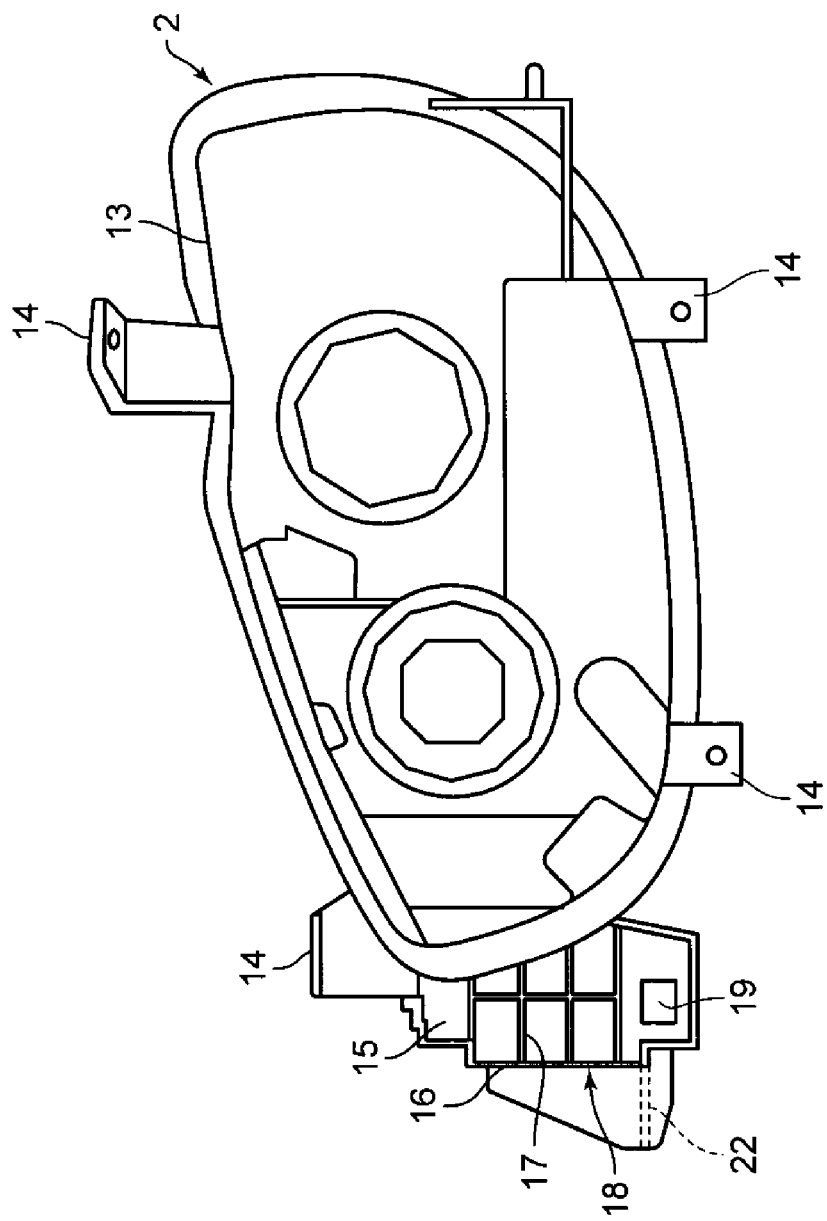
FIG. 5 is a back view showing a specific structure of the headlamp unit.
Figure 6:
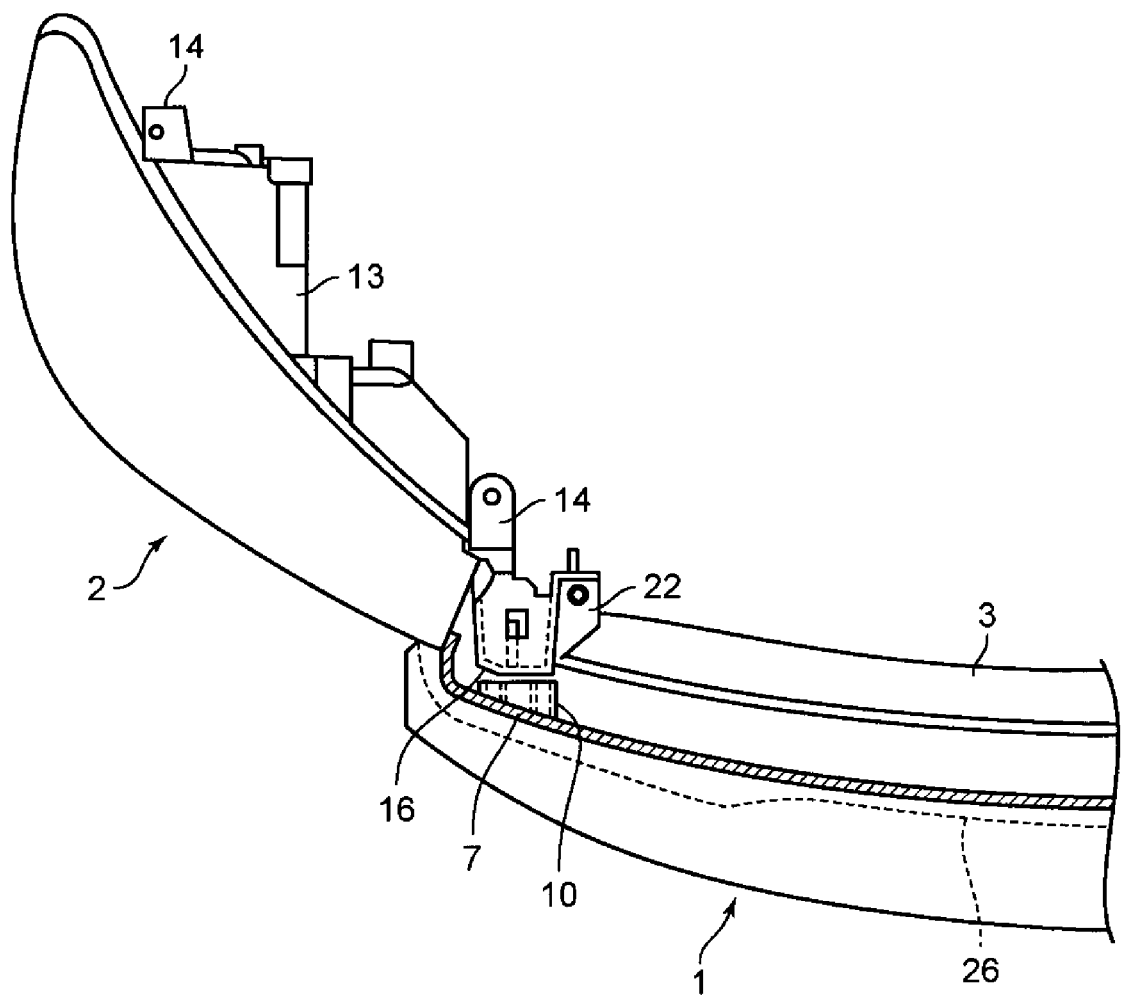
FIG. 6 is a plan view showing the attachment state of the headlamp unit.

The headlamp unit 2 comprises a lamp housing 13 which is covered with a lens at its front face as shown in FIGS. 5 and 6. Plural main attachment portions 14 which are attached via bolts or the like to a vehicle-body member located behind them, such as a shroud support member or the like, not illustrated, which is provided to extend from a front end of an apron panel (not illustrated) constituting a sidewall portion of the front vehicle body, passes an upper rear portion of the headlamp unit 2 and then extends forward, are provided at an outer peripheral portion of the lamp housing 13.

Further, the load absorption portion 18 is arranged at the inside end portion of the lamp housing 13, which is located on the inside of an edge of the bumper face 1 in an elevation view. The load absorption portion 18 comprises a front face plate 15 which is arranged to face a back face of the load transmission portion 10 and a rectangular frame 16 which projects rearward from an outer peripheral side portion of the front face plate 15, so that it is formed in a boxy shape having plural ribs 17 formed inside.

A recess for positioning 19, into which the above-described projection for positioning 11 provided at the design face portion 7 is inserted, is formed at a lower portion of the load absorption portion 18. Further, a sub attachment portion 22 which is attached via an attachment bolt 21 to a fixing portion 20 which is provided to project at a side portion of a front face of the radiator shroud 4 is provided at an inside end portion of the load absorption portion 18 and the recess for positioning 19 which are provided at the lamp housing 13.

Herein, the sub attachment portion 22 of the lamp housing 13 may be attached to a front bulkhead which is integrally formed at a vehicle-body frame of a front side frame 23 in place of the above-described radiator shroud 4.

Figure 7:
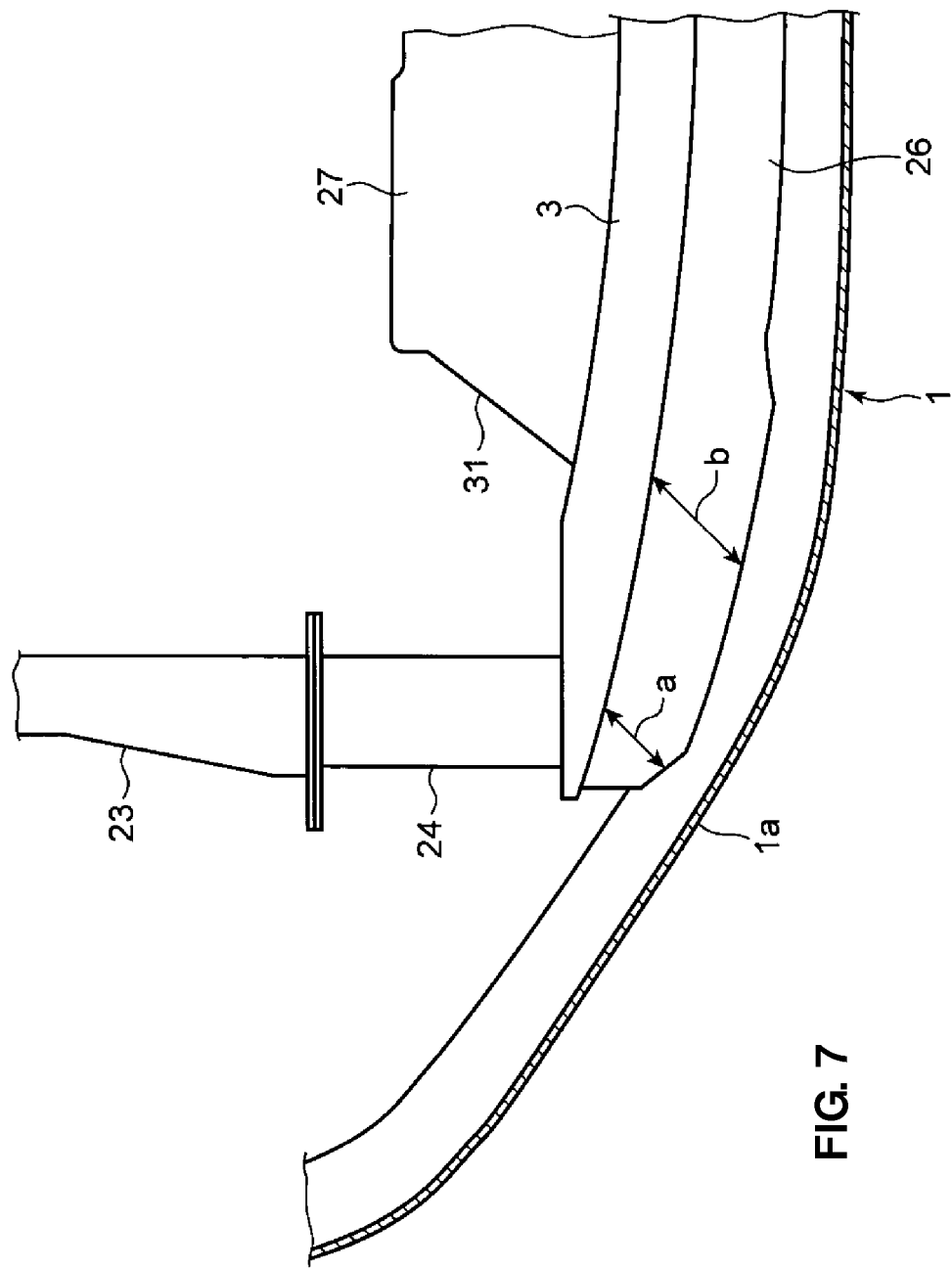
FIG. 7 is a sectional view taken along line VII-VII of FIG. 3.

As shown in FIGS. 1 and 7, the vehicle-body frame comprised of a pair of front side frames 23 is provided to extend in a vehicle longitudinal direction at both side portions of the front vehicle body. A crush can 24 which has a higher rigidity than the above-described load absorption portion 18 is attached to a front end portion of each of the front side frames 23, and both side end portions of the bumper beam 3 are supported by the crush cans 24. The bumper beam 3 comprises a body portion projecting rearward and flange portions formed at upper and lower sides of the body portion, which has a U-shaped cross section so as to have a relatively high rigidity. The bumper face 1 and the bumper beam 3 are configured such that both side portions thereof curve with a specified curvature, so that the side portion of the front face of the vehicle body is formed in a streamlined shape in the plan view.

The impact absorption member 26 which is made of a foaming-resin-made resilient member is attached to the front face of the bumper beam 3 over its almost entire length in the vehicle width direction. The impact absorption member 26 is arranged to face the back face of the bumper face 1 and extends in the vehicle width direction along a central portion, in the vertical direction, of the bumper face 1. This impact absorption member 26 has a resilient deformation when the object hits against the bumper face 1 and the impact load is inputted. Thus, the impact absorption member 26 performs the function of absorbing the impact load which the object may receive.

An outside end portion of the impact absorption member 26, as shown in FIG. 7, extends outward and rearward along the back face of the bumper face 1, and the thickness a of the outside end portion of the impact absorption member 26 is configured to be thinner than the thickness b of its inside portion, so that the shape of the impact absorption member 26 in the plan view is formed in the streamlined shape to correspond to the above-described bumper face 1. Further, as shown in FIG. 3, in the elevational view of the impact absorption member 26, the vertical size α of the outside end portion of the impact absorption member 26 is greater than the vertical side β of its central portion.

A lower stiffener 27 is arranged to extend in the vehicle width direction along a lower portion of the back face of the bumper face 1 below the bumper beam 3. This lower stiffener 27 has the function of sweeping a leg portion of the object hitting against the front end portion of the vehicle, and its front end portion projects forward beyond the bumper beam 3 in the side view. In the present embodiment, the front end portion of the lower stiffener 27 projects forward beyond the front face of the impact absorption member 26.

Figure 8:
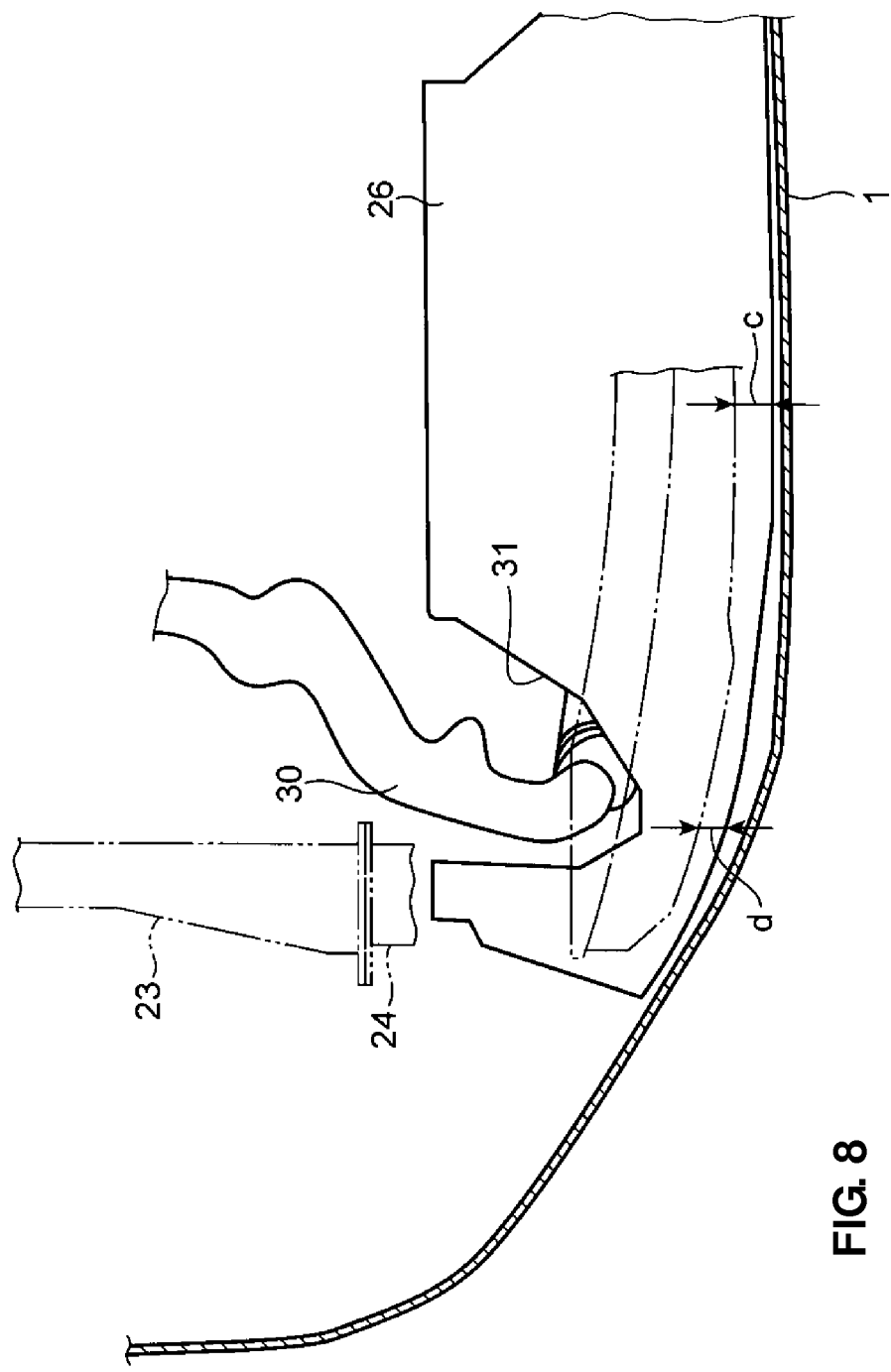
FIG. 8 is a sectional view taken along line VIII-VIII of FIG. 3.

The lower stiffener 27 is attached to a lower portion of the radiator shroud 4 which is arranged between a pair of front side frames 23. As shown in FIG. 8, the forward projection amount c of a central portion of the lower stiffener 27 relative to the bumper beam 3 in the plan view is configured to be greater than the projection amount d of the side portion of that, and side end portions of the lower stiffener 27 and the impact absorption member 26 and the load absorption portion 18 are arranged on the outside of the lower portion of the radiator shroud 4. Further, as shown in FIG. 8, the side end portion of the lower stiffener 27 has a notch 31 to avoid any interference with any device arranged at a vehicle front portion, specifically, a connection pipe 30 which connects an intercooler 29 (see FIG. 1) provided in front of the radiator shroud 4 and an engine body.

According to the structure described above, when a pedestrian or the like, as the object, hits against the central portion of the vehicle's front face, legs of the pedestrian or the like are swept by the lower stiffener 27 so that the pedestrian or the like can be received by the engine hood, not illustrated, and thereby protected. Further, when a light collision in which another vehicle or the like, as the object, lightly hits against the front face of the vehicle or the like happens, the bumper face 1 being pushed rearward contacts the above-described impact absorption member 26 and thereby the impact absorption member 26 has the resilient deformation and thereby absorb the impact load. Consequently, the impact which the above-described object may receive can be absorbed as well.

Moreover, the impact load transmitted to the upper portion of the bumper face 1 causes the load transmission portion 10 of the design face portion 7 to contact the load absorption portion 18 of the lamp housing 13, so that the load absorption portion 18 can receive and absorb this impact load. As described above, in the present embodiment, the resistance of the impact absorption member 26 is set to be lower than that of the lower stiffener 27 or the load absorption portion 18, and the resistance of the lower stiffener 27, the load absorption portion 18, or the load transmission portion 10 is set to be lower than that of the crush can 24 or the bumper beam 3.

For example, the resistance of the impact absorption member 26 is set at 2 kN, the resistance of the lower stiffener 27 is set at 4 kN, and the resistance of both the load transmission portion and the load absorption 18 is set at 7 kN. Herein, the resistance of the above-described respective members should not be limited to the above-described examples, but can be properly adjusted according to the vehicle-body structure, collision safety standards or the like, and also obtained through simulations, tests or the like.

In case a large impact load which may not be absorbed only by the resilient deformations of the impact absorption member 26, the load absorption portion 18 and the like is inputted, the above-described impact load is absorbed by the plastic deformations of the bumper beam 3 and the crush cans 24, and also the impact load is absorbed by front portions of the front side frames 23. Thereby, it can be effectively prevented that the above-described impact load acts on the arrangement portions of the engine and the like.

And, when the light collision in which the object, such as a pedestrian or another vehicle, hits lightly against the side portion of the vehicle's front face happens so that the side portion of the bumper face 1 is pushed obliquely rearward or the like, the impact load can be absorbed by the resilient deformation of the impact absorption member 26, and the load transmission portion 10 provided at the back face of the design face portion 7 contacts the load absorption portion 18 at the lamp housing 13 of the headlamp unit 2 so that the impact load can be transmitted from the load transmission portion 10 to the load absorption portion 18 and thereby absorbed.

As described above, in the front structure of a vehicle in which the bumper face 1 is provided at the front portion of the vehicle, the impact absorption member 26 is provided behind the bumper face 1 to absorb the impact load inputted to the specified-height position of the bumper face 1 through its deformation, the lower stiffener 27 is provided below the impact absorption member 26 and projects forward to sweep the leg portion of the object hitting against the front portion of the vehicle, and headlamp units 2 are provided at both side portions of the bumper face 1, the lamp housing 13 of the headlamp unit 2 is supported at the vehicle-body member located in back of the lamp housing 13, such as the shroud support member or the radiator shroud 4, the load absorption portion 18 provided on the inside of and rearward from the edge of the bumper face 1 to absorb the impact load is provided integrally at the lamp housing 13, and the load transmission portion 10 to transmit the impact load inputted to the bumper face 1 to the load absorption portion 10 is provided at the bumper face 1. Thereby, even when the object hits against the side portion of the front portion of the vehicle body, the impact load can be efficiently absorbed by using the load absorption portion 18 provided at the lamp housing 13, so that the impact which the object may receive can be effectively absorbed.

That is, when any object hits against the central portion of the central face of the vehicle or the like, the impact load acting on the object can be properly absorbed by the impact absorption member 26 provided behind the bumper face 1, and also the leg portion of the object is swept by the lower stiffener 27 so that the object can be properly received by the engine hood and thereby protected. Meanwhile, when the object hits against the side portion of the vehicle's front face, the impact load acting on the object can be efficiently transmitted from the load transmission portion 10 provided at the bumper face 1 to the load absorption portion 18 provided integrally with the lamp housing 13 and the vehicle-body side member located rearward as well as the impact load can be properly absorbed by the impact absorption member 26. Thus, the impact which the object hitting against the front face of the vehicle body may receive can be effectively absorbed.

Further, according to the above-described embodiment, the impact absorption member 26 is attached to the front face of the bumper beam 3 provided behind the bumper face 1 to extend in the vehicle width direction, and the load absorption portion 18 is provided above the bumper beam 3. Thereby, the impact load inputted through the object's hitting against the side portion of the vehicle's front face can be efficiently transmitted to the impact absorption member 26 and the load absorption portion 18 and thereby effectively absorbed, so that the impact which the object may receive can be effectively absorbed. Further, since the impact absorption member 26 is attached to the front face of the bumper beam 3 which, in general, may have a relatively high rigidity, any direct contact of the object with the bumper beam 3 is avoided so that the object can be effectively restrained from receiving the improperly large impact, and also the absorption effect of the impact load by the impact absorption member 26 can be sufficiently achieved.

In the present embodiment, the load absorption portion 18 provided at the lamp housing 13 is provided at the specified position which is located above and away from the outside end portion of the impact absorption member 26 attached to the bumper beam 3. Thereby, even in case the object hits against the vicinity of the outside end portion of the impact absorption member 26 and therefore the impact absorption effect of the impact absorption member 26 may not be achieved sufficiently, the impact load can be efficiently absorbed by using the load absorption portion 18 provided at the lamp housing 13, so that the impact which the object may receive can be effectively absorbed.

Further, according to the present embodiment, the outside end portion of the impact absorption member 26 is provided to extend outward and rearward along the back face of the bumper face 1, and the thickness a of the outside end portion of the impact absorption member 26 is configured to be smaller than the thickness b of an inside portion of the impact absorption member 26. Thereby, the vehicle body is formed in the streamlined shape, so that the vehicle's design can be improved. And, even in case the impact load inputted through the object's hitting against the side portion of the front face of the vehicle or the like may not be sufficiently absorbed by the outside end portion of the outside end portion of the impact absorption member 26, the impact load can be transmitted to the load absorption portion 18 located above the impact absorption member 26 and thereby absorbed properly, so that the impact which the object may receive can be effectively absorbed. In particular, in case the vertical size α of the outside end portion of the impact absorption member 26 is configured to be greater than the vertical size β of the central portion of that in the elevational view as shown in FIG. 3, the impact which the object hitting against the side of the vehicle's front face or the like may receive can be absorbed more effectively.

Further, in case, like the present embodiment, the plural main attachment portions 14 which are attached to the vehicle-body member located behind the bumper beam 3, such as the radiator shroud support member, are provided at the headlamp unit 2, and the sub attachment portion 22 which is attached to another vehicle-body member, such as the radiator shroud 4 or the front bulkhead, is provided at the periphery of the load absorption portion 18, the impact load transmitted to the load absorption portion 18 of the lamp housing 13 via the load transmission portion 10 of the bumper face 1 in the vehicle frontal collision or the like can be dispersed through a transmission route where it is transmitted from the main attachment portion 14 to the radiator shroud support member or the like by way of the lamp housing 13 and another transmission route where it is transmitted from the sub attachment portion 22 to the radiator shroud 4, the front bulkhead or the like by way of the load absorption portion 18. Thereby, the impact which the object may receive can be absorbed more effectively.

Moreover, according to the structure of the present embodiment in which the radiator shroud 4 is provided between the front side frames 23 provided at both sides of the vehicle, the sub attachment portion 22 of the headlamp unit 2 is attached to the radiator shroud 4 or the front bulkhead. Thereby, the impact load transmitted to the load absorption portion 18 of the lamp housing 13 via the load transmission portion 10 of the bumper face 1 in the vehicle frontal collision or the like can be transmitted to either one of the radiator shroud 4 and the front bulkhead and the vehicle-body side member, such as the radiator shroud support member, and thereby absorbed properly, so that the impact which the object may receive can be more effectively absorbed.

Also, since the load absorption portion 18 provided at the headlamp unit 2 has the plural ribs 17 formed at its back face and is formed in the boxy shape to face the load transmission portion 10, the load absorption function of the load absorption portion 18 can be ensured sufficiently with a simple and light-weight structure, and the impact load can be efficiently absorbed by the load absorption portion 18 without increasing the weight of the vehicle body, so that the impact which the object may receive can be effectively absorbed.

Further, in case, like the present embodiment, the bumper face 1 has the bumper-face main portion 5 and the design face portion 7 attached to at the opening portion 6 formed at the bumper-face main portion 5, and the load transmission portion 10 is formed integrally at the back face of the design face portion 7, the impact load inputted to the bumper face 1 can be efficiently transmitted to the load absorption portion 18 and thereby absorbed effectively by using the design face portion 7.

Figure 9:
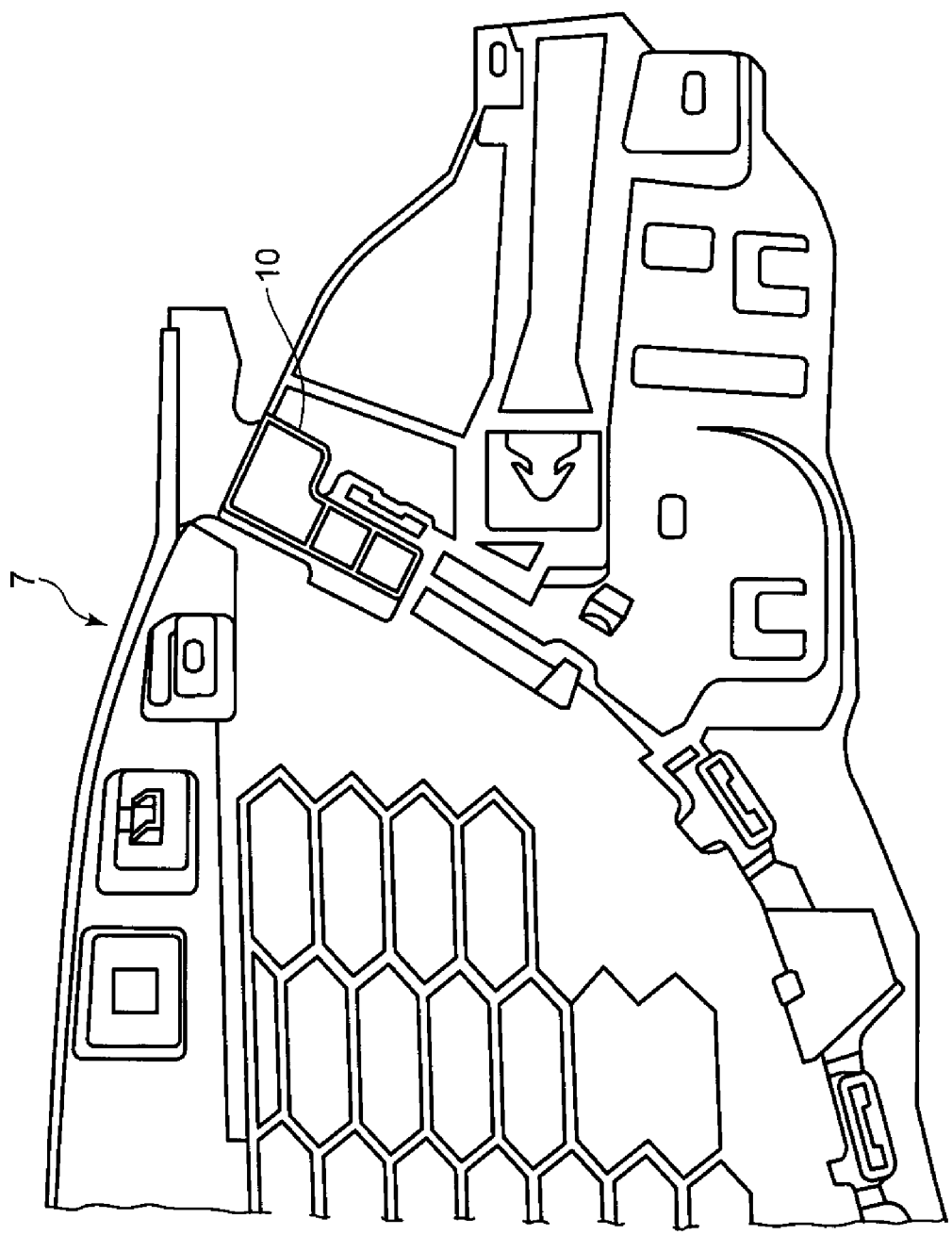
FIG. 9 is a back view showing another example of a design face portion.

In particular, in case the load transmission portion 10 is provided in back of the bumper-face main portion 5, the impact load inputted through the object's hitting against the bumper-face main portion 5 can be efficiently transmitted to the load absorption portion 18 from the load transmission portion 10 and thereby absorbed effectively, so that the impact which the object may receive can be absorbed sufficiently. Herein, as shown in FIG. 9, in case the side portion of the radiator grill formed at the design face portion 7 slants downward, the load transmission portion 10 may be configured to slant along the side portion of the radiator grill. In this case, it can be effectively prevented that some improper deformation occurs at the design face portion during its production.

Also, in case the recess for positioning 19 is formed at the periphery of the load absorption portion 18, and the projection for positioning 11 which corresponds to the recess for positioning 19 is formed at the periphery of the load transmission portion 10 as shown in the present embodiment, the projection for positioning 11 is inserted into the recess for positioning 19, so that the bumper face 1 at which the load transmission portion 10 is formed can be prevented from moving and thereby its attachment state can be stable. Accordingly, even if the bumper face 1 having a large area is made of a thin plate member having a low rigidity, some secular change occurs to the bumper face 1, or the like, the attachment state of the bumper face 1 can be prevented from being unstable, so that the stable attachment state of the bumper face 1 can be maintained properly in the long term.

Herein, of course, in place of the above-described embodiment, a projection for positioning may be formed at the periphery of the load absorption portion 18, and a recess projection for positioning which corresponds to the projection for positioning may be formed at the periphery of the load transmission portion 10. While the load absorption portion 18 of the above-described embodiment does not deform positively when the load absorption portion 18 at the headlamp unit 2 receives the load, any other modification of the structure in which the load absorption portion 18 is made deformed by receiving the load may be applied.

Further, since the lower stiffener 27 of the present embodiment is configured such that the forward-projection amount c of its central portion relative to the bumper beam 3 is greater than the forward-projection amount d of its side portion relative to the bumper beam 3, the object hitting against the central portion of the vehicle's front face can be effectively swept onto the engine hood by the lower stiffener 27 and properly received by the engine hood. Meanwhile, when the object hits against the side portion of the vehicle's front face, the impact load acting on the object can be absorbed effectively by the impact absorption member 26 and the load absorption portion 18 which are provided at both side portions of the bumper face 1.

According to the present embodiment, the lower stiffener 27 is supported at the lower portion of the radiator shroud 4 or the front bulkhead, the respective side end portions of the lower stiffener 27 and the impact absorption member 26 and the load absorption portion 18 are provided on the outside of the lower portion of the radiator shroud 4 or the front bulkhead. Thereby, while it may be difficult that the object is effectively swept onto the engine hood by the lower stiffener 27 when the object hits against the side portion of the vehicle's front face, the impact load acting on the object can be absorbed effectively by the impact absorption member 26 and the load absorption portion 18 which are provided at the side portion of the vehicle's front face.

Moreover, according to the present embodiment, the notch 31 to prevent interference with the device, i.e., the connection pipe 30 for the intercooler 29 which is provided at the font portion of the vehicle is formed at the side end portion of the lower stiffener 27. Thereby, while the object-sweeping function of lower stiffener 27 may not be performed sufficiently in the case of the object's hitting against the side portion of the vehicle's front face, a improperly large impact load can be prevented from being inputted to the object by the impact absorption member 26 and the load absorption portion 18 which are provided at the side portion of the vehicle's front face, so that the object can be protected properly.

Figure 10:
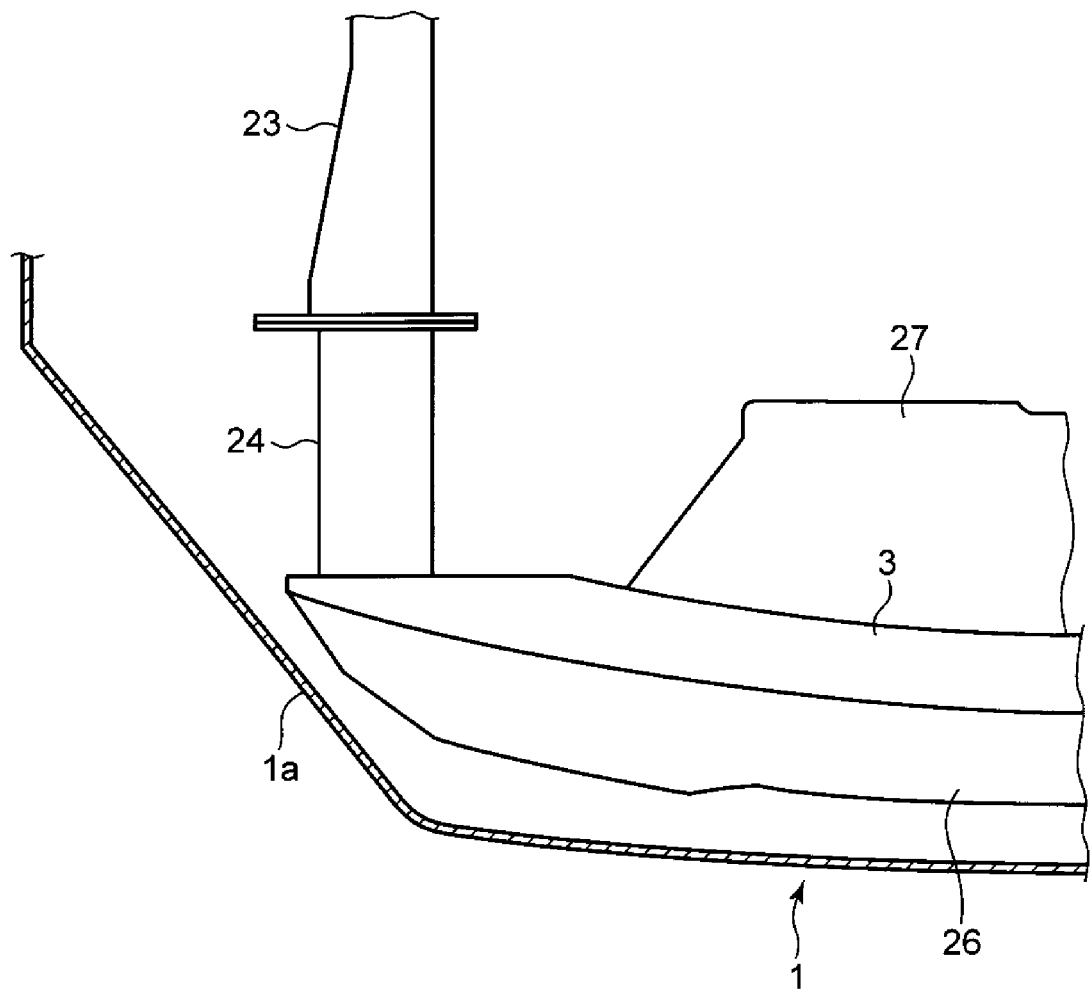
FIG. 10 is a plan-sectional view showing a modified example of the bumper face.
Figure 11:
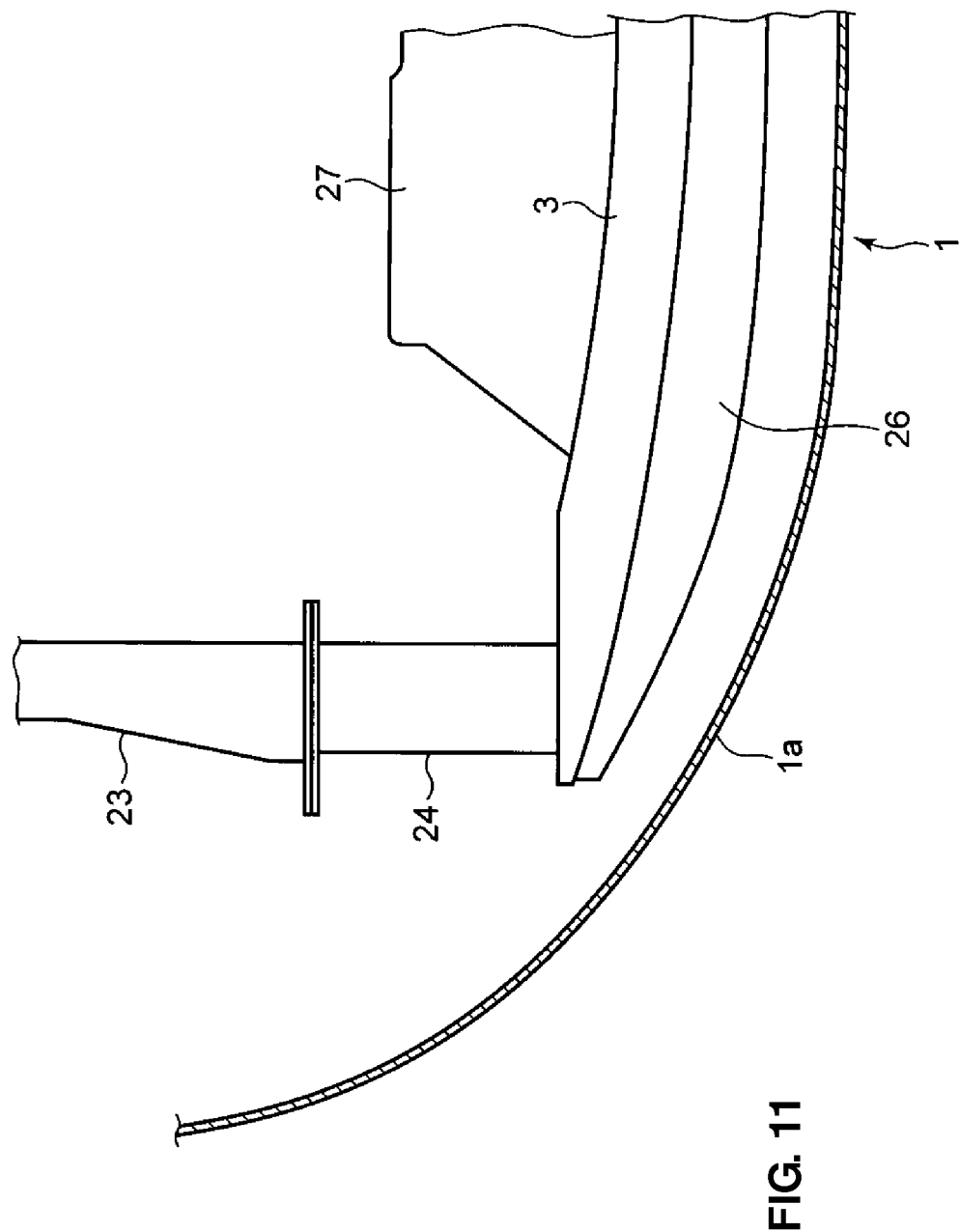
FIG. 11 is a plan-sectional view showing another modified example of the bumper face.

Herein, while the above-described embodiment shows one example in which both side portions 1a of the bumper face 1 is configured to curve with the specified curvature so that the side portion of the front face of the vehicle body has the streamlined shape in the plan view as shown in FIG. 7, the bumper face 1 may be formed in different shapes as shown in FIG. 10 or 11. That is, in FIG. 10, both side portions of the bumper face 1 slant rearward straightly. In another example shown in FIG. 11, meanwhile, both side portions of the bumper face 1 have a curvature which is greater than that of the above-described embodiment shown in FIG. 8, so that the curve degree of the streamlined shape can be shaper. These alternative examples can provide an advantage of effectively improving the aerodynamics characteristics and maneuverability (quick turning) of the vehicle.

Meanwhile, the above-described alternative examples have a tendency that since the length of the crush cans 24 may not be made properly short to ensure a proper crushable area in the vehicle frontal collision, it may be necessary that the outside end portion of the impact absorbing member 26 is set to be thinner than the inside portion, so that the impact absorption function by the side portions of the impact absorption member 26 may not be achieved sufficiently. In this case, however, by configuring such that the impact load inputted when the object hits against the side portion of the vehicle's front face can be transmitted to the impact absorption member 26 and the load absorption portion 18 located above this member 26 and thereby absorbed, the impact which the object may receive can be properly absorbed.

The present invention should not be limited to the above-described embodiments, and any other modifications and improvements may be applied within the scope of a spirit of the present invention.

What is claimed is:

1. A front structure of a vehicle, comprising:
  a bumper face provided at a front portion of the vehicle;
  an impact absorption member provided behind the bumper face to absorb an impact load inputted to a specified-height position of the bumper face through deformation thereof;
  a lower stiffener provided below the impact absorption member and projecting forward to sweep a leg portion of an object hitting against the front portion of the vehicle; and
  a pair of headlamp units provided at both side portions of the bumper face,
  wherein a pair of lamp housings of said pair of headlamp units is supported at a vehicle-body member located in back of the pair of lamp housings, a pair of load absorption portions, which is provided on the inside of and rearward from both-side edges of the bumper face to absorb an impact load, is provided as one piece with the pair of lamp housings, said pair of load absorption portions being formed disconnectedly from each other, and a pair of load transmission portions to transmit the impact load inputted to the bumper face to said pair of load absorption portions is formed in one piece with a back face of the bumper face, said pair of load transmission portions being formed disconnectedly from each other, each of said pair of load transmission portions is comprised of a rearward-projecting portion which projects rearward from the back face of the bumper face, and said load absorption portions are arranged behind said load transmission portions such that a front face of the load absorption portion faces a back face of the load transmission portion, and a recess for positioning which opens forward or a projection for positioning which projects forward is formed at a periphery of each of said pair of load absorption portions, and a projection for positioning which projects rearward and corresponds to said forward-opening recess for positioning of the load absorption portion or a recess for positioning which opens rearward and corresponds to said forward-projecting projection for positioning of the load absorption portion is formed at a periphery of each of said load transmission portions, said forward-opening recess or forward-projecting projection for positioning of the load absorption portion and said rearward-projecting projection or rearward-opening recess for positioning of the load transmission portion are arranged so as to engage each other by insertion when the bumper face is assembled to a vehicle body.

2. The front structure of a vehicle of claim 1, wherein a bumper beam is provided behind said bumper face to extend in a vehicle width direction, said impact absorption member is attached to a front face of the bumper beam, and said load absorption portion is provided above the bumper beam.

3. The front structure of a vehicle of claim 2, wherein said load absorption portion is provided at a specified position which is located above and away from an outside end portion of said impact absorption member attached to the bumper beam.

4. The front structure of a vehicle of claim 3, wherein the outside end portion of the impact absorption member is provided to extend outward and rearward along a back face of the bumper face, and the thickness of the outside end portion of the impact absorption member is configured to be smaller than that of an inside portion of the impact absorption member.

5. The front structure of a vehicle of claim 2, wherein plural main attachment portions which are attached to a vehicle-body member located behind said bumper beam are provided at said headlamp unit, and a sub attachment portion which is attached to another vehicle-body member located behind the bumper beam is provided at a periphery of said load absorption portion.

6. The front structure of a vehicle of claim 5, wherein a radiator shroud or a front bulkhead is provided between vehicle-body frames provided at both sides of the vehicle, and said sub attachment portion of the headlamp unit is attached to the radiator shroud or the front bulkhead.

7. The front structure of a vehicle of claim 1, wherein said load absorption portion has plural ribs formed at a back face thereof and is formed in a boxy shape to face said load transmission portion.

8. The front structure of a vehicle of claim 1, wherein said bumper face has a bumper-face main portion and a design face portion attached to an opening portion formed at the bumper-face main portion, and said load transmission portion is formed in one piece with said design face portion of the bumper face.

9. The front structure of a vehicle of claim 8, wherein said load transmission portion is provided in back of said bumper-face main portion.

10. The front structure of a vehicle of claim 4, wherein said lower stiffener is configured such that a forward-projection amount of a central portion thereof relative to said bumper beam is greater than that of a side portion thereof relative to the bumper beam.

11. The front structure of a vehicle of claim 6, wherein said lower stiffener is supported at a lower portion of said radiator shroud or front bulkhead, respective side end portions of the lower stiffener and the impact absorption member and said load absorption portion are provided on the outside of said lower portion of the radiator shroud or front bulkhead.

12. The front structure of a vehicle of claim 1, wherein a notch to prevent interference with a device provided at the front portion of the vehicle is formed at a side end portion of said lower stiffener.

13. The front structure of a vehicle of claim 1, wherein a resistance of said impact absorption member is set to be lower than that of said load absorption portion as well as that of said lower stiffener.

14. The front structure of a vehicle of claim 2, wherein each resistance of said impact absorption member, load absorption portion and lower stiffener is set to be lower than that of said bumper beam.

15. The front structure of a vehicle of claim 1, wherein said load absorption portion is formed in a boxy shape having plural ribs formed inside, which comprises a front face plate arranged to face the back face of the load transmission portion and a frame projecting rearward from an outer peripheral side portion of the front face plate.

* * * * *